United States Patent
Kato et al.

(10) Patent No.: US 6,242,133 B1
(45) Date of Patent: Jun. 5, 2001

(54) HYDROGEN-ABSORBING ALLOY ELECTRODE FOR ALKALINE SECONDARY BATTERY AND METHOD OF MANUFACTURE THEREOF

(75) Inventors: Kikuko Kato, Katano; Masutaka Ouchi; Yohei Hirota, both of Tokushima; Teruhiko Imoto, Katano; Nobuyuki Higashiyama, Minoo; Mamoru Kimoto, Hirakata; Shin Fujitani, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/333,935

(22) Filed: Jun. 16, 1999

(30) Foreign Application Priority Data

Jun. 17, 1998 (JP) .................................................. 10-169949

(51) Int. Cl.$^7$ .............................. H01M 4/58; H01M 4/62
(52) U.S. Cl. ...................... 429/218.2; 429/232; 429/59; 29/623.5
(58) Field of Search .................... 429/59, 232, 218.2; 29/623.5

(56) References Cited

U.S. PATENT DOCUMENTS

| | | | |
|---|---|---|---|
| 4,140,840 | * | 2/1979 | Ruben .................................. 429/190 |
| 4,145,483 | * | 3/1979 | Bonnemay et al. .................. 429/103 |
| 4,508,799 | * | 4/1985 | Gopikanth et al. .................. 429/196 |
| 4,753,786 | * | 6/1988 | Watanabe et al. .................... 423/439 |
| 5,571,637 | * | 11/1996 | Idota ..................................... 429/218 |
| 5,686,203 | * | 11/1997 | Idota et al. ........................... 429/194 |
| 5,707,764 | * | 1/1998 | Miyamoto et al. .................. 429/223 |
| 5,780,184 | * | 7/1998 | Coco et al. ........................... 429/217 |
| 5,798,189 | * | 8/1998 | Hayashida et al. .................. 429/101 |
| 5,798,190 | * | 8/1998 | Andrei et al. ........................ 429/192 |
| 5,856,044 | * | 1/1999 | McLin et al. ........................ 429/218 |
| 6,019,802 | * | 2/2000 | Ishizuka et al. ..................... 29/623.5 |
| 6,040,087 | * | 3/2000 | Kawakami ........................ 429/218.1 |

FOREIGN PATENT DOCUMENTS

| | | |
|---|---|---|
| 61-66366 | 4/1986 | (JP) . |
| 2-135665 | 5/1990 | (JP) . |
| 2-234355 | 9/1990 | (JP) . |
| 5-13075 | 1/1993 | (JP) . |
| 7-73874 | 3/1995 | (JP) . |

* cited by examiner

*Primary Examiner*—Patrick Ryan
*Assistant Examiner*—Colleen P. Cooke
(74) *Attorney, Agent, or Firm*—Kubovcik & Kubovcik

(57) ABSTRACT

A hydrogen-absorbing alloy electrode for an alkaline secondary battery. The electrode is prepared by adding a transition metal salt to a paste comprising a hydrogen-absorbing alloy powder and binder. The electrode improves charge-discharge cycle performance and high rate discharge capacity at low temperature of an alkaline secondary battery.

13 Claims, No Drawings

HYDROGEN-ABSORBING ALLOY ELECTRODE FOR ALKALINE SECONDARY BATTERY AND METHOD OF MANUFACTURE THEREOF

FIELD OF THE INVENTION

The present invention relates to a hydrogen-absorbing alloy electrode for an alkaline secondary battery and a method of manufacturing a hydrogen-absorbing alloy electrode.

BACKGROUND OF THE INVENTION

An alkaline secondary battery, which uses a metal compound, for example, nickel hydroxide, for a positive electrode and a hydrogen-absorbing alloy for a negative electrode, has lately been attracting attention as a high energy density battery for replacing nickel-cadmium batteries.

A hydrogen-absorbing alloy performs absorption and desorption of hydrogen as an active material when a battery charges and discharges in an electrolyte. The alloy lattice is deformed by absorption and desorption of hydrogen and alloy particles are pulverized. The pulverized alloy drops or separates from the electrode to cause a reduction in capacity. It also causes mechanical strength of the electrode and electrical conductivity to deteriorate. It is difficult to maintain battery capacity for a long term.

A hydrogen-absorbing alloy powder has been combined with a binding agent of an alkali resistant synthetic resin and a thickening agent to manufacture a hydrogen-absorbing alloy electrode as disclosed in Japanese Patent Laid-Open Publication No. 61-66366.

Styrene-butadiene copolymer which has excellent pliability and adhesive strength is proposed for use as a binding agent for an electrode in Japanese Patent Laid-Open Publication No. 2-135665. In the hydrogen-absorbing alloy electrode disclosed in this publication, the binding agent is deformed with change of volume of the hydrogen-absorbing alloy powder to prevent separation of the pulverized alloy from the electrode. However, reduction of contact between hydrogen-absorbing alloy particles and an electrolyte prevents proper electrical reactions and high rate discharge characteristics of the battery are deteriorated.

OBJECTS OF THE INVENTION

An object of the present invention is to prevent separation of the pulverized alloy from the electrode and to inhibit reduction in capacity after repeated charge-discharge cycles.

Another object of the present invention is to increase contact between the alloy particles and the electrolyte to improve high rate discharge characteristics.

SUMMARY OF THE INVENTION

The present invention provides a hydrogen-absorbing alloy electrode for an alkaline secondary battery comprising a paste on an electrically-conductive substrate, wherein the paste comprises a hydrogen-absorbing alloy powder, binder and a transition metal salt.

The present invention also provides an alkaline secondary battery comprising the hydrogen-absorbing alloy electrode of the present invention as described above.

The present invention also provides a method of manufacturing a hydrogen-absorbing alloy electrode for an alkaline secondary battery comprising mixing a hydrogen-absorbing alloy powder, binder, a transition metal salt and water to prepare a paste, and applying the paste on an electrically-conductive substrate.

The hydrogen-absorbing alloys useful in the present invention are not particularly limited. Suitable alloys include $LaNi_5$, $LaNi_4Co$ and $LaNi_4Cu$ such as described in Japanese Patent Laid-Open publication No. 59-49671, and hydrogen-absorbing alloys of an Mm-Ni type (where "Mm", a so-called "Misch Metal" is a mixture of rare earth elements, such as La, Ce, Nd, Pr, etc.). These alloys produce batteries that can obtain a high capacity.

As the binder, at least one of polyvinyl pyrrolidone (PVP), polyvinyl alcohol (PVA), polytetrafluoroethylene (PTFE) and styrene-butadiene rubber (SBR) can be used. The content of the binder is preferably in a range of 0.5 wt % to 10.0 wt % based on the weight of the hydrogen-absorbing alloy powder.

As the transition metal salt, at least one salt selected from the group consisting of cobalt chloride ($CoCl_2$), nickel chloride ($NiCl_2$) and copper chloride ($CuCl_2$) is used. The amount of the transition metal salt is in a range of 0.3 wt % to 5.0 wt % based on the weight of said hydrogen-absorbing alloy powder.

As an electrically-conductive substrate, a punched metal, a foamed metal, and the like can be used.

The hydrogen-absorbing alloy powder can be used in the form of so-called cast alloy which is ground after casting or an atomized alloy.

A strength of electrode of the hydrogen-absorbing alloy electrode increases by manufacturing the electrode by mixing a hydrogen-absorbing alloy powder, binder, a transition metal salt and water. Therefore, reduction of capacity of a battery after repeated charge-discharge cycles for a long term can be decreased by using the electrode because of an increase in holding power of alloy. Electrical-conductivity between alloy particles or alloy and electrical collector (electrical-conductive substrate) and high rate discharge characteristics at a low temperature are improved.

High rate discharge property at a low temperature is improved because contact between the alloy and an electrolyte is not inhibited. The reason for such improvement is believed to be that the transition metal salt is dissolved and forms a metal chelate compound which polymerizes. Since impregnating ability of a binder with an electrolyte is not affected, contact between alloy and the electrolyte is maintained. Diffusion of hydroxide ion is not inhibited between an active surface of an alloy and an electrolyte. Therefore, electrical reactions can take place normally. Furthermore, binding property between alloy particles, and the alloy and electically-conductive substrate is improved and conductivity is also improved. As a result of such improvement, it is believed that high rate discharge capacity at low temperature is improved.

DESCRIPTION OF PREFERRED EMBODIMENTS

The present invention is described below in detail in conjunction with certain examples. However, it is of course understood that the present invention is not limited to the following examples. The present invention can be modified within the scope of the appended claims.

EXAMPLE 1

[Preparation of Alloy]

Misch metal, which is mixture of rare earth elements (hereinafter referred to as Mm), Ni, Co, Al and Mn were mixed at a mole ratio of 1.0:3.1:1.0:0.4:0.5 to prepare a hydrogen-absorbing alloy by a high-frequency dissolution method. The obtained alloy was ground and was sieved for adjustment of particle size to obtain a hydrogen-absorbing alloy of average particle size of 80 μm.
[Preparation of Electrode]

3.0 wt % aqueous solution of cobalt chloride ($CoCl_2$) as a transition metal salt based on the weight of the hydrogen-absorbing alloy was added to 1.0 wt % of polyethylene oxide (PEO) and 5.0 wt % of polytetrafluoroethylene (PTFE), based on the weight of the hydrogen-absorbing alloy, as a binder and the hydrogen-absorbing alloy and binder were mixed to prepare a paste. The paste was coated and filled on both sides of a 0.8 mm thick punched metal nickel plate as an electrically-conductive substrate to prepare an hydrogen-absorbing alloy electrode.
[Preparation of Battery]

The electrode was rolled by a hydraulic press and was wound with a sintered type nickel electrode, which is conventionally used, the electrodes being separated by an alkali resistant separator to prepare a spiral type electrode. The prepared electrode was placed in a battery can. 30 wt % of potassium hydroxide aqueous solution was poured into the can to prepare a battery (A1), which was limited by positive electrode capacity, having AA size and 1000 mAh capacity.

EXAMPLES 2 TO 7

Batteries A2 to A7 were prepared in the same manner as Example 1 except that 1.0 wt % of polyethylene oxide (PEO) and 5.0 wt % of polyvinyl alcohol (PVA) (Example 2);

1.0 wt % of polyethylene oxide (PEO) and 5.0 wt % of polyvinyl pyrrolidone (PVP) (Example 3);

3.0 wt % of polyvinyl alcohol (PVA) and 3.0 wt % of polyvinyl pyrrolidone (PVP) (Example 4);

5.0 wt % of polyvinyl pyrrolidone (PVP) (Example 5);

1.0 wt % of polyethylene oxide (PEO) and 5.0 wt % of styrene-butadiene rubber (SBR) (Example 6); and 6.0 wt % of styrene-butadiene rubber (SBR) (Example 7), respectively, were used as a binder instead of 1.0 wt % of polyethylene oxide (PEO) and 5.0 wt % of polytetrafluoroethlene (PTFE).

Comparative Example 1

A comparative battery X1 was prepared in the same manner as Example 1 except that no transition metal salt was used.

Comparative Example 2

A comparative battery X2 was prepared in the same manner as Example 1 except that a binder solution containing 1.0 wt % of polyethylene oxide (PEO) and 5.0 wt % of styrene-butadiene rubber (SBR) and no transition metal salt was used.

Comparative Example 3

A comparative battery X3 was prepared in the same manner as Example 1 except that 3.0 wt % of calcium hydroxide ($Ca(OH)_2$) based on the weight of the hydrogen-absorbing alloy powder was used instead of 3.0 wt % of cobalt chloride ($CoCl_2$), i.e., no transition metal salt was used.

Evaluation of Properties of Electrode and Battery

Properties of the electrodes and batteries prepared above, i.e., electrode strength, cycle property and high rate discharge capacity at low temperature, are as follows.
[Electrode strength]

Strength of electrode of each hydrogen-absorbing alloy electrode was measured by using a cross cut tape test defined by JIS (Japanese Industrial Standard) K 5400.
[Test of cycle performance]

After charging each battery with a constant current of 200 mA (0.2C) for 6 hours at room temperature (250° C.), a constant current discharge was performed at 200 mA up to 1.0 V. Initial discharge capacity of each battery was 1000 mAh. Charge and discharge cycles were repeated 500 times in the same manner as described above. Discharge capacity (mAh) was measured after each charge-discharge cycle up to the 500th cycle. A discharge capacity after the charge and discharge cycle was repeated 500 times is referred as Cycle Performance.
[High Rate Discharge Capacity at Low Temperature]

Batteries were charged at 200 mA (0.2C) at 25° C. for 6 hours, and then discharge capacity was measured when the batteries were discharged to 1.0 v at 3000 mA (3C) at 0° C.

Results of the tests are shown in Table 1.

TABLE 1

| BATTERY | BINDER | AMOUNT OF $CoCl_2$ | STRENGTH OF ELECTRODE | DISCHARGE CAPACITY AT 0° C. (mAh) | DISCHARGE CAPACITY AFTER 500 CYCLES (mAh) |
|---|---|---|---|---|---|
| A1 | PEO + PTFE | 3.0 | 1.3 | 867 | 870 |
| A2 | PEO + PVA | 3.0 | 1.6 | 826 | 800 |
| A3 | PEO + PVP | 3.0 | 1.4 | 856 | 790 |
| A4 | PVA + PVP | 3.0 | 1.3 | 800 | 770 |
| A5 | PVP | 3.0 | 1.3 | 820 | 790 |
| A6 | PEO + SBR | 3.0 | 2.1 | 551 | 780 |
| A7 | SBR | 3.0 | 2.1 | 423 | 780 |
| X1 | PEO + PTFE | 0 | 1.0 | 138 | 645 |
| X2 | PEO + SBR | 0 | 2.2 | 124 | 690 |
| X3 | PEO + PTFE | $Ca(OH)_2$ | 1.0 | 140 | 650 |

Batteries of the present invention which were prepared by using polyvinyl pyrrolidone (PVP), polyvinyl alcohol (PVA), polytetrafluoroethylene(PTFE) and styrene-butadiene rubber (SBR) as a binder and using a transition metal salt, have good electrode strength and excellent discharge characteristics.

When a transition metal salt other than cobalt chloride ($CoCl_2$), i.e., nickel chloride ($NiCl_2$), copper chloride ($CuCl_2$), cobalt bromide ($CoBr_2$) cobalt oxide (CoO), were used, similar results were obtained.

EXAMPLE 8

Batteries of the present invention (B1 to B6, where B3 is the same as A5) were prepared in the same manner as Example 1 except that the amount of polyvinyl pyrrolidone (PVP) as binder was varied between 0.1 and 15 wt % (15.0, 10.0, 3.0, 1.0, 0.5 and 0.1 wt %, respectively) based on the weight of said hydrogen-absorbing alloy powder to determine the effect on electrode strength and discharge characteristics.

Test results are shown in Table 2.

TABLE 2

| BATTERY | BINDER (wt %) | STRENGTH OF ELECTRODE | DISCHARGE CAPACITY AT 0° C. (mAh) | DISCHARGE CAPACITY AFTER 500 CYCLES (mAh) |
|---|---|---|---|---|
| B1 | 15.0 | 1.2 | 650 | 695 |
| B2 | 10.0 | 1.6 | 800 | 800 |
| B3(A5) | 3.0 | 1.3 | 820 | 790 |
| B4 | 1.0 | 1.2 | 815 | 795 |
| B5 | 0.5 | 1.3 | 830 | 790 |
| B6 | 0.1 | 1.2 | 740 | 695 |

According to the results, a preferred amount of binder is in a range of 0.5 wt % to 10.0 wt %.

Similar results were obtained when various amount of binder as used in Example 1 were used instead of polyvinyl pyrrolidone (PVP).

EXAMPLE 9

Batteries of the present invention (C1 to C6, where C1 is the same as A1 in Example 1) were prepared in the same manner as Example 1 except that various transition metal salts, i.e., 3.0 wt % of nickel chloride (NiCl$_2$), copper chloride (CuCl$_2$), cobalt bromide (CoBr$_2$), cobalt oxide (CoO) and nickel bromide (NiBr$_2$), based on the weight of said hydrogen-absorbing alloy powder, were used instead of cobalt chloride to determine the effect on electrode strength and discharge characteristics.

Test results are shown in Table 3.

TABLE 3

| BATTERY | TRANSITION METAL SALT | STRENGTH OF ELECTRODE | DISCHARGE CAPACITY AT 0° C. (mAh) | DISCHARGE CAPACITY AFTER 500 CYCLES (mAh) |
|---|---|---|---|---|
| X1 | None | 1.0 | 138 | 645 |
| C1(A1) | Cobalt chloride | 1.3 | 867 | 870 |
| C2 | Nickel chloride | 1.3 | 800 | 880 |
| C3 | Copper chloride | 1.4 | 865 | 855 |
| C4 | Cobalt bromide | 1.2 | 735 | 795 |
| C5 | Cobalt oxide | 1.3 | 760 | 810 |
| C6 | Nickel bromide | 1.3 | 728 | 760 |

The results show that transition metal salts other than cobalt chloride, i.e., nickel chloride, copper chloride, cobalt bromide, cobalt oxide and nickel bromide, provide excellent effects.

Especially, cobalt chloride, nickel chloride and copper chloride provide excellent high rate discharge characteristics at low temperature and are particularly suitable as materials for preparation of the electrode of the present invention.

EXAMPLE 10

Batteries of the present invention (D1 to D5) were prepared in the same manner as Example 1 except that the amount of cobalt chloride was varied between 0.1 and 10.0 wt % (10.0, 5.0, 1.0, 0.3 and 0.1 wt %, respectively) based on the weight of said hydrogen-absorbing alloy powder to determine the effect on electrode strength and discharge characteristics.

Test results are shown in Table 4 together with test results of battery A1 in Example 1.

TABLE 4

| BATTERY | AMOUNT (wt %) | STRENGTH OF ELECTRODE | DISCHARGE CAPACITY AT 0° C. (mAh) | DISCHARGE CAPACITY AFTER 500 CYCLES (mAh) |
|---|---|---|---|---|
| X1 | 0 | 1.0 | 138 | 645 |
| A1 | 3.0 | 1.3 | 867 | 870 |
| D1 | 10.0 | 1.2 | 680 | 715 |
| D2 | 5.0 | 1.3 | 872 | 860 |
| D3 | 1.0 | 1.5 | 830 | 858 |
| D4 | 0.3 | 1.4 | 800 | 785 |
| D5 | 0.1 | 1.2 | 670 | 710 |

The results show that a preferred amount of cobalt chloride is in a range of 0.3 wt % to 5.0 wt %.

Similar results were obtained when other transition metal salts, i.e, nickel chloride, copper chloride, cobalt bromide, cobalt oxide and nickel bromide, were used.

EXAMPLE 11

Research was conducted to determine whether a method of manufacturing the alloy powder affects the strength of the electrode and battery properties.

Battery E was prepared in the same manner as battery A1 in Example 1 except that an atomized alloy prepared by a gas atomization method was used instead of an alloy prepared by a high-frequency dissolution method.

Test results are shown in Table 5 together with the results for battery A1.

TABLE 5

| BATTERY | ALLOY | DISCHARGE CAPACITY AT 0° C. (mAh) | DISCHARGE CAPACITY AFTER 500 CYCLES (mAh) |
|---|---|---|---|
| A1 | High Frequency Soluble Alloy | 867 | 870 |
| E | Atomized Alloy | 925 | 900 |

Table 5 does not include the results of the strength of electrode test. There are not any differences in the strength of the electrode. However, battery E has better discharge characteristics than battery A1. Therefore, an atomized alloy is preferable for the present invention.

ADVANTAGES OF THE INVENTION

A hydrogen-absorbing alloy electrode for an alkaline secondary battery of the present invention can increase strength of an electrode because a transition metal salt is added to a paste comprising a hydrogen-absorbing alloy powder and binder. If the electrode of the present invention is used for an alkaline secondary battery, cycle performance and high rate discharge capacity at low temperature can be improved. Industrial value of the present invention is significant.

What is claimed is:

1. A hydrogen-absorbing alloy electrode for an alkaline secondary battery comprising a paste on an electrically-conductive substrate, wherein said paste comprises an hydrogen-absorbing alloy powder, binder and a transition metal salt.

2. A hydrogen-absorbing alloy electrode for an alkaline secondary battery according to claim 1, wherein said binder is at least one material selected from the group consisting of polyvinyl pyrrolidone (PVP), polyvinyl alcohol (PVA), polytetrafluoroethylene (PTFE) and styrene-butadiene rubber (SBR).

3. A hydrogen-absorbing alloy electrode for an alkaline secondary battery according to claim 1, wherein said binder is present in an amount in a range of 0.5 wt % to 10.0 wt % based on the weight of said hydrogen-absorbing alloy powder.

4. A hydrogen-absorbing alloy electrode for an alkaline secondary battery according to claim 1, wherein said transition metal salt is at least one material selected from the group consisting of cobalt chloride ($CoCl_2$), nickel chloride ($NiCl_2$) and copper chloride ($CuCl_2$).

5. A hydrogen-absorbing alloy electrode for an alkaline secondary battery according to claim 1, wherein said transition metal salt is present in an amount in a range of 0.3 wt % to 5.0 wt % based on the weight of said hydrogen-absorbing alloy powder.

6. A hydrogen-absorbing alloy electrode for an alkaline secondary battery according to claim 1, wherein said hydrogen-absorbing alloy powder is an atomized alloy.

7. An alkaline secondary battery comprising a hydrogen-absorbing alloy electrode according to claim 1.

8. A method of manufacturing a hydrogen-absorbing alloy electrode for an alkaline secondary battery comprising mixing an hydrogen-absorbing alloy powder, binder, a transition metal salt and water to prepare a paste, and applying said paste on an electrically-conductive substrate.

9. A method of manufacturing a hydrogen-absorbing alloy electrode for alkaline secondary battery according to claim 8, wherein said binder is at least one material selected from the group consisting of polyvinyl pyrrolidone (PVP), polyvinyl alcohol (PVA), polytetrafluoroethylene (PTFE) and styrene-butadiene rubber (SBR).

10. A method of manufacturing a hydrogen-absorbing alloy electrode for an alkaline secondary battery according to claim 8, wherein said binder is present in an amount in a range of 0.5 wt % to 10.0 wt % based on the weight of said hydrogen-absorbing alloy powder.

11. A method of manufacturing a hydrogen-absorbing alloy electrode for an alkaline secondary battery according to claim 8, wherein said transition metal salt is at least one material selected from the group consisting of cobalt chloride ($CoCl_2$), nickel chloride ($NiCl_2$) and copper chloride ($CuCl_2$).

12. A method of manufacturing a hydrogen-absorbing alloy electrode for an alkaline secondary battery according to claim 8, wherein said transition metal salt is present in an amount in a range of 0.3 wt % to 5.0 wt % based on the weight of said hydrogen-absorbing alloy powder.

13. A method of manufacturing a hydrogen-absorbing alloy electrode for an alkaline secondary battery according to claim 8, wherein said hydrogen-absorbing alloy powder is an atomized alloy.

* * * * *